United States Patent
Kaufmann et al.

(10) Patent No.: US 10,894,561 B2
(45) Date of Patent: Jan. 19, 2021

(54) DRIVING ASSISTANCE SYSTEM FOR REVERSING A MINING HAULAGE VEHICLE

(71) Applicants: SAFEMINE AG, Baar (CH); HEXAGON MINING TECNOLOGIA E SISTEMAS S.A., Belo Horizonte (BR)

(72) Inventors: Thomas Kaufmann, Zurich (CH); Marcus Mundim, Belo Horizonte (BR); Arthur Queiroz, Belo Horizonte (BR); Fabricio Miranda, Belo Horizonte (BR); Ildefonso Ferreira, Belo Horizonte (BR)

(73) Assignees: SAFEMINE AG, Baar (CH); HEXAGON MINING TECNOLOGIA E SISTEMAS S.A., Belo Horizonte (BR)

( * ) Notice: Subject to any disclaimer, the term of this patent is extended or adjusted under 35 U.S.C. 154(b) by 152 days.

(21) Appl. No.: 16/005,556

(22) Filed: Jun. 11, 2018

(65) Prior Publication Data
US 2018/0354557 A1    Dec. 13, 2018

(30) Foreign Application Priority Data
Jun. 12, 2017   (EP) ..................................... 17175587

(51) Int. Cl.
*B62D 15/02*    (2006.01)
*G07C 5/02*    (2006.01)
(Continued)

(52) U.S. Cl.
CPC ......... *B62D 15/0295* (2013.01); *B60W 30/18* (2013.01); *B62D 15/021* (2013.01);
(Continued)

(58) Field of Classification Search
CPC .................. B62D 15/0295; B62D 12/029; B62D 15/028; B62D 15/021; B60W 30/18;
(Continued)

(56) References Cited

U.S. PATENT DOCUMENTS 6,088,644 A * 7/2000 Brandt .................. E01C 19/004
                                                        172/4.5
6,351,697 B1 * 2/2002 Baker .................... G01G 19/08
                                                        342/357.24
(Continued)

FOREIGN PATENT DOCUMENTS

AU    2004223688 A1    8/2004
AU    2013200273 A1    9/2013
(Continued)

OTHER PUBLICATIONS

Chilean Office Action in application No. 201801516 dated Jul. 6, 2018 (English Translation).
(Continued)

*Primary Examiner* — Thomas Ingram
(74) *Attorney, Agent, or Firm* — Maschoff Brennan (57) ABSTRACT

A driving assistance system for reversing a mining haulage vehicle, particularly for reversing a haul truck into a defined target position in a loading or dumping area, wherein the driving assistance system is configured that the target position is determined based on a logged loading tool position of the earthmoving machine, wherein steering instructions are provided to a light indicator when the transmission of the haulage vehicle is shifted to reverse.

20 Claims, 6 Drawing Sheets

(51) Int. Cl.
  *G01S 19/42* (2010.01)
  *G01S 13/931* (2020.01)
  *B60W 30/18* (2012.01)
  *H04W 4/70* (2018.01)
  *B60W 50/14* (2020.01)

(52) U.S. Cl.
  CPC ......... *B62D 15/028* (2013.01); *B62D 15/029* (2013.01); *G01S 13/931* (2013.01); *G01S 19/42* (2013.01); *G07C 5/02* (2013.01); *B60W 2050/146* (2013.01); *B60W 2300/17* (2013.01); *B60W 2540/16* (2013.01); *B60W 2556/65* (2020.02); *B60Y 2200/41* (2013.01); *G01S 2013/932* (2020.01); *G01S 2013/9317* (2013.01); *G01S 2013/9322* (2020.01); *G01S 2013/9325* (2013.01); *H04W 4/70* (2018.02)

(58) Field of Classification Search
  CPC ......... B60W 2540/16; B60W 2300/17; B60W 2550/408; B60W 2050/146; G01S 13/931; G01S 19/42; G01S 201/9322; G01S 2013/932; G01S 2013/9325; G01S 2013/9317; G07C 5/02
  See application file for complete search history.

(56) References Cited

U.S. PATENT DOCUMENTS

| | | | | |
|---|---|---|---|---|
| 9,052,716 B2* | 6/2015 | Tanaka | ................. | G05D 1/0278 |
| 2003/0122687 A1 | 7/2003 | Trajkovic et al. | | |
| 2006/0069472 A1 | 3/2006 | Makela | | |
| 2011/0307138 A1* | 12/2011 | Kellar | ................... | G01S 19/426 |
| | | | | 701/23 |
| 2013/0054133 A1* | 2/2013 | Lewis | ................. | G07C 5/0841 |
| | | | | 701/423 |
| 2013/0060458 A1* | 3/2013 | Makela | ................. | G05D 1/024 |
| | | | | 701/301 |
| 2014/0046540 A1* | 2/2014 | Ruth | .................... | G05D 1/0225 |
| | | | | 701/41 |
| 2015/0094913 A1* | 4/2015 | Muller | ..................... | B62D 6/00 |
| | | | | 701/41 |
| 2016/0033969 A1 | 2/2016 | Denaro | | |
| 2016/0223350 A1* | 8/2016 | Lewis | ................ | G01C 21/3407 |
| 2016/0333690 A1* | 11/2016 | Puura | ..................... | G01S 17/89 |
| 2016/0333691 A1* | 11/2016 | Puura | .................. | G05D 1/0251 |

FOREIGN PATENT DOCUMENTS

| | | |
|---|---|---|
| CL | 201402917 | 2/2015 |
| DE | 10 2007 039252 A1 | 2/2009 |
| EP | 3045862 A1 | 7/2016 |
| WO | 2011141619 A1 | 11/2011 |
| WO | 2011141629 A1 | 11/2011 |
| WO | 2013165303 A1 | 11/2013 |
| WO | 2015107068 A1 | 7/2015 |

OTHER PUBLICATIONS

European Search Report date of completion Dec. 13, 2017 as received in Application No. 17175587.9.

* cited by examiner

DRIVING ASSISTANCE SYSTEM FOR REVERSING A MINING HAULAGE VEHICLE

CROSS-REFERENCE TO RELATED APPLICATIONS

This application claims priority to European Patent Application No. 17175587.9 filed on Jun. 2, 2017. The foregoing patent application are incorporated herein by reference.

FIELD OF INVENTION

The invention relates to a driving assistance system for reversing a mining haulage vehicle, particularly for reversing a haul truck into a defined target position in a loading or dumping area.

BACKGROUND

By way of example, surface mines and similar sites or areas are generally operated by means of a large number of machinery, haulage vehicles, and staff. Some of the machines or haulage vehicles may be exceedingly large and heavy, wherein control of such oversized objects is difficult and dangerous, e.g. because of limited operator visibility. Thus, infrastructure, people, or regular vehicles, e.g. street legal vehicles, in the vicinity are at risk from a movement of these oversized objects.

Therefore, it has been proposed to use GNSS-devices (GNSS=global navigation satellite system, such as GPS) on board of haulage vehicles and other machines, such as cranes, to generate proximity warnings in order to reduce the risk of collisions, e.g. to reduce the risk of collisions between different haulage vehicles and/or between haulage vehicles and persons. Such a system may be based on devices mounted to the objects, each device comprising a GNSS receiver, a control unit for deriving positional data using the signal of the GNSS receiver, a radio circuit for wireless exchange of the positional data with the other devices, and an output device for outputting proximity warnings, e.g. allowing the driver of a vehicle to obtain information on some of the obstacles or persons nearby.

However, a GNSS system may lose accuracy, e.g. when multi-path situations occur. For example, a multi-path situation occurs when signals transmitted from GNSS satellites are reflected by local terrain, buildings, or machinery, thereby resulting in a plurality of signals being received by the GNSS receiver. Due to the plurality of signals being received, each of which may be phase shifted and/or time delayed, the GNSS receiver may not be able to accurately detect its location. Thus, if the GNSS system loses accuracy, such as due to entering a multi-path environment, the overall warning system may be severely hindered in its accuracy.

Besides safety aspects, positioning systems on mine sites may further be important in view of productivity. For example, mining is typically subject to high competitive pressure, wherein the mine site is typically run non-stop, i.e. day and night, and individual work steps have to be performed under high time pressure. In particular during the night or under adverse conditions as bad weather, visibility of a machine operator may be severely reduced. Furthermore, given the oversized dimensions of the used machinery, movement of objects, e.g. positioning of a haulage vehicle, may be time consuming, wherein any repositioning due to inaccurate positioning may in the end add up to increased production costs.

For example, inaccurate reversing operations of a haul truck for positioning under a shovel may cause opportunity costs because during the time the shovel spends waiting for the truck to reposition the shovel is unable to load material. Therefore, since both the shovel and the haul truck cost money to operate, the time spent for repositioning has a quantifiable cost, but no economic process value. For example, even one re-spotting event per hour per shovel may in the end lead to substantial increase in costs.

Furthermore, inaccurate location of a haul truck may for example cause material spillage in front of the facility, which spillage may be common enough that the location requires commonly allocated support equipment such as a wheel dozer.

Another aspect of positioning systems on mine sites may be to reduce maintenance outlay, e.g. again to reduce costs. For example, centered loads on a haul truck result in longer tire life and lowered suspension maintenance, wherein off centered distribution of weight has a directly attributable effect on tire wear and suspension components, which increases operational cost and lowers availability of the trucks.

By way of another example, rock spill generally occurs at initial start of motion of a haul truck after loading and typically falls from the center of the bed, thus between the tires of the haul truck. If the next truck backs over the spillage, it can result in tire damage. Thus, a positioning system may provide consistent guidance to the loading location, wherein by using the same tire track each time driving over spillage that could potentially slice tires could be avoided.

Also maintenance outlay of a shovel may be reduced. For example, when a shovel operator tries to reach rather than asking the truck operator to reposition, unnecessary stress on shovel elements or even accidental collisions between the shovel and the truck may occur. Furthermore, a collision may result in mechanical shock that can be very harsh on the truck operator and lead to injuries.

Typically a mine site is busy at day and night and is often run around-the-clock. Thus, operation includes a multitude of different work shifts and a high degree of coordination over a large area is required. In particular, the conditions on the site may vary fast on local and global scales, e.g. due to different weather conditions, work progress, accidents, change of schedules, change of restriction zones, development of new hazard zones, etc.

Therefore, planned routes for machine movement, e.g. routes of a haul truck between a loading and dumping location, may require regular updates or even real-time adjustments, e.g. triggered by a haul truck driver or an operator of an earthmoving machine such as a shovel or wheel loader. For example, it may be required to adapt a planned path based on an actual position of the shovel body or its counterweight, or an occurrence of fractures and cracking, e.g. which increase the risk of the edge falling away during a dumping operation.

BRIEF DESCRIPTION

It is therefore an object of some embodiments of the present invention to minimize equipment down time and maintenance outlay.

Another object is to provide a more reliable and simplified driving assistance system for moving a mining haulage vehicle on a mine site, which overcomes the above mentioned limitations.

Those objects are achieved by realizing the features of the independent claim. Features which further develop the invention in an alternative or advantageous manner are described in the dependent patent claims.

Some embodiments of the invention relate to a driving assistance system for reversing a mining haulage vehicle, particularly for reversing a haul truck into a defined target position in a loading or dumping area. The driving assistance system comprises a positioner, in particular a GNSS receiver and/or a radio frequency device of a point-to-point radio ranging system, e.g. for two-way ranging, adapted and specifically foreseen to be mounted on the haulage vehicle, configured to generate a positioning information for the haulage vehicle, and a computing unit configured to derive a defined target position and corresponding steering instructions to reverse the haulage vehicle into the target position, which comprises a target position and an orientation of the haulage vehicle in that target position, based on the positioning information.

According to some embodiments of the invention the system, the system comprises a machine-to-machine communication network, wherein the machine-to-machine communication network is configured to provide machine-to-machine communication between a first transceiver which is adapted and specifically foreseen to be mounted on the haulage vehicle and a second transceiver which is adapted and specifically foreseen to be mounted on an earthmoving machine having a loading tool, e.g. a shovel or a wheel loader having.

The inventive system further comprises a light indicator specifically foreseen to be mounted on the haulage vehicle, particularly LED indicators to be mounted on a vehicle mirror, e.g. a rear view mirror or a side-mirror, of the haulage vehicle, wherein the light indicator is configured to provide at least two states, namely one state which is indicative of an instruction for left steering and another state which is indicative of an instruction for right steering, respectively. A log interface is adapted and specifically foreseen to be mounted on the earthmoving machine, wherein the log interface is configured to log, i.e. to register or record, an actual position of the loading tool of the earthmoving machine, and the computing unit is configured to derive the target position and to provide the steering instructions to the light indicator based on a logged loading tool position, wherein the driving assistance system is configured that the steering instructions are provided to the light indicator when the transmission of the haulage vehicle is shifted to reverse.

For example, the pivot point of a shovel may be calculated and combined with measured shovel parameters to determine the counterweight swing radius and a relative dipper position. An operator of the shovel may hold the dipper in a desired position and log this position, e.g. by pressing a button of the log interface to initiate a position determination of the dipper, wherein the determined dipper position is logged as the optimal load spot. A status indicator may then indicate to a haul truck driver that a load spot is stored and available to load the truck. As soon as the haul truck is in position, the shovel operator may then restore the logged dipper position in order that the loading unit carrying the load, e.g. the bucket, is centrally positioned over the loading platform of the haul truck.

Thus, a definitive location to position the truck may be provided based on the actual scenario of a continuously changing environment. For example, a shovel may move between consecutive loading and dumping steps, leading to different loading positions with different swing angles of the shovel. In a shovel constrained loading scenario this means that more trucks per hour are loaded, resulting in additional material throughput.

By way of example, the system may be built with a light bar mounted on a haul truck's external mirror, wherein an approach parameter is provided by a continuously derived radial distance around a shovel, which may for example be equipped with its own positioning device, e.g. based on GPS, particularly a high precision GPS receiver for RTK positioning. The haul truck and the shovel may communicate in a publish-subscribe messaging fashion to exchange their position and/or their orientation. For example, the workplace may have RTK coverage as well as a wireless network infrastructure common to both the GNSS receiver mounted on the haul truck and the positioning device of the shovel. The system may calculate the optimum reversing path for the haul truck based on the approach parameter, e.g. as soon as the truck is backing into a shovel pit to be loaded, or when backing to a hopper to unload. For calculating the reverse path classic algorithms known in the art may be used.

Thus, on the one hand, the approaching angle when backing towards the edge of the dump may be monitored with high precision, preventing breaking through the berm with one wheel, e.g. wherein the edge of the dump is precisely defined by a dozer operator. Furthermore, optimal fill guidance for paddock dumping or topsoil stockpile operations may be provided.

On the other hand, for loading the truck the communication between the truck and the shovel allows the truck driver to be guided to the correct spot given by the shovel position and thus avoiding collisions and re-spotting time waste. In particular, the planned route will for example avoid mapped fixed obstacles such as infrastructure, as well as collisions to the variably positioned shovel body or its counterweight. For example, the target position and the corresponding steering instructions may further make use of map information, particularly based on a continuously updated map comprising fixed and variable positions of objects.

Thus, the reverse guidance assistance system according to the invention has significant operational and safety benefits to mining operators. For example, by providing a truck operator with the precise positioning of the truck in relation to the shovel the operator can position the haul truck in the loading location more quickly. By calculating a path and providing a truck operator with guidance along that path, machine damage due to hard cornering and inadvertence contact with the shovel and/or related infrastructure is eliminated, not to mention any associated injuries. In particular, the inventive driver assistance system enables efficient backing manoevering of large oversized haulage vehicles without requiring a special expertise or training of the driver.

By way of another example, additional applications such as lane guidance may be offered with the same hardware installation.

Future developments may take temporary control of the trucks steering and/or propulsion system to further increase precision and speed of the system.

In one embodiment, the positioner is configured that it is operable in a low-precision mode and in a high-precision mode, wherein the high-precision mode provides higher positioning accuracy than the low-precision mode, and the computing unit is configured to determine whether the haulage vehicle is located inside or outside a defined area, e.g. in the vicinity or around the earthmoving machine, and to check whether the positioner is operating in the high-precision mode. Therefore, the driving assistance system may be configured to check whether the positioner is operating in high-precision mode when the haulage vehicle enters the defined area, wherein the computing unit is configured to provide to turn on the high-precision mode or to provide a warning in case the high-precision mode is not available, e.g. when lacking high-precision GPS or RTK-coverage. Thus, it may be ensured that in the vicinity of a shovel driving assistance is based on high-precision positioning only. If high-precision position is not available the backing manoeuvre may for example be automatically stopped or forbidden.

According to another embodiment, the positioner comprises at least one of a GNSS receiver having two GNSS antennas, particularly wherein the high-precision mode is based on RTK positioning based on the two GNSS antennas, and a point-to-point radio ranging system providing time-of-flight measurements by radio frequency signals, particularly ultra-wideband signals, between anchors and tags, i.e. radio frequency (RF) devices, based on a defined measuring protocol, e.g. the ALOHA protocol, wherein a set of anchors is adapted and specifically foreseen to be mounted on the haulage vehicle.

Guidance to the truck driver or an operator of an earthmoving machine may further be provided by additional audio and/or lightbar prompts. For example, based on a truck ID or a truck type of an approaching haul truck a shovel operator may be automatically informed about specific loading requirements for that haul truck.

Furthermore, the driver of the haul truck or the machine operator may notice a new obstacle in the reverse path of the haul truck, e.g. due to resent material spillage, and they may interactively warn each other and/or adapt the initially calculated reverse path of the haul truck. For example, the operator of the shovel may be automatically provided with several alternative loading positions in the reach of the shovel from which he can choose the best option for the approaching haul truck. Vice versa, for example, different optional stop positions may be provided to the driver of the haul truck driver, e.g. by additional audible prompts, wherein an interactive trade-off between the optimal stop position of the haul truck and additional shovel movement may be performed.

Therefore, in a further embodiment, the target position and/or the steering instructions are derived based on information distributed over the machine-to-machine network, wherein the information comprises at least one of a machine type of the earthmoving machine, a machine ID of the earthmoving machine, a positioning information for the earthmoving machine, a rotational center and/or a loading range of the earthmoving machine, e.g. a cantilever range, input from an operator of the earthmoving machine, a vehicle type of the haulage vehicle, a vehicle ID of the haulage vehicle, a positioning information for the haulage vehicle, and input from a driver of the haulage vehicle.

For example, the system may further comprise a display specifically foreseen to be mounted in an operator cab of an earthmoving machine and/or a display specifically foreseen to be mounted in the cab of the haulage vehicle, wherein the display is configured to indicate at least one of a positioning of the haulage vehicle, a planned reversing path of the haulage vehicle, an approaching path to the earthmoving machine, a positioning of the earthmoving machine, a target position of the earthmoving machine when the haulage vehicle is approaching, positioning information of surrounding vehicles, positioning information of surrounding earthmoving machines, the target position of the haulage vehicle, areas to be avoided by the haulage vehicle, e.g. based on a swing radius of the earthmoving machine, and objects of interest along the reversing path of the haulage vehicle, particularly obstacles and objects in danger of the moving haulage vehicle and/or the moving earthmoving machine.

Thus, the driver and/or the machine operator may then react based on the displayed information and their observation of the actual environment.

For example, during forward movement of the haul truck, the display in the haul truck cabin may show shovels in the vicinity of the truck, as well as optimal ranges to position the truck before starting reverse manoeuvers towards each one of the displayed shovels. Furthermore, an indication of a shovel's swing radius may be provided (e.g. defined by the counter weight dimensions), which must be avoided by the truck operator.

In particular, the display mounted in the cab of the haulage vehicle may further be configured to have an auto-zoom functionality, wherein the auto-zoom functionality is configured to adjust a zoom-factor of the display content in such a way that the positioning of the haulage vehicle and the earthmoving machine, particularly the target position of the haulage vehicle, are displayed at any point in time, i.e. the truck and target spot are always put on an optimal position on the display. Therefore, the entire operation is automatic and no intervention of the truck driver is required, e.g. reducing any risk due to distraction of the truck driver.

On the other hand, a display in the shovel cab may show all trucks in the vicinity of the shovel, as well as planned routes of the backing trucks. Thus a shovel operator may anticipate an approaching truck and set an appropriate target position for loading that truck. In particular, a shovel operator may cancel the backing manoever at any time, e.g. when he identifies a potential risk or problem.

In another embodiment, the transceivers of the machine-to-machine communication network are configured to send a broadcast signal according to a defined broadcast protocol. For example, the broadcast signal may be used to determine which shovel the truck should request a spot position from, e.g. based on the truck and/or a shovel ID. On the other hand, an operator of a shovel may be provided with an indication of a truck waiting with no spotting information, e.g. by flashing indicators and/or an audible prompt.

According to another embodiment the system is configured that the steering instructions are provided in such a way that the haulage vehicle does not approach the earthmoving machine closer than a defined radius, particularly the counterweight swing radius, in particular wherein the log interface is configured to forbid logging a loading tool position leading to a target position closer than the defined radius.

Thus, by way of example, a shovel operator may set the target spot and continue operating the shovel normally, while the truck is guided to the planned position. Thus the system identifies the tramming operation during which the set spot is kept stored. However, the system may provide an alarm if the shovel as a whole starts moving to a different position, i.e. instead of just rotating, upon which the loaded spot is cancelled.

In particular, according to another embodiment, the computing unit is configured to derive a distance of the haulage vehicle to the target position corresponding to the target position, wherein the computing unit and the light indicator are configured to indicate the distance based on a defined visual coding, particularly a defined blink coding and/or a defined color coding, and/or the driver assistance system comprises a speaker which is configured to indicate the distance based on a defined audible signal, e.g. a beep coding or a voice prompt.

For example, in an exemplary scenario according to the invention, a haul truck equipped with the inventive driver assistance system enters a shovel pit or dumping area and it is ensured that the GNSS receiver will change from a low-precision mode to a high precision mode that allows for decimeter accuracy or better. When the transmission of the haul truck is shifted to reverse, a path will be planned to a spot location avoiding mapped objects, wherein using this path, an optimal steering angle will be calculated and the haul truck driver will be prompted to adjust the steering angle to this value through light bars attached to the mirrors of the haul truck and through an audible prompt. As the driver reverses the truck, the trucks position and orientation will be compared to the calculated path and prompts are given to the operator if corrections are necessary. A distance to the stopping point will be indicated by how quickly the directional indicators on the mirrors blink and possibly through a beep coding having an increased beep frequency the closer the truck is located to its end position. When the spot is reached, the indicators will for example be on solid and an audible prompt may be given.

It goes without saying, that the target position and/or the steering instructions may further be derived based on additional positioning data common in the field of object location and positioning on mine sites, wherein the additional data is provided to the computing unit, in particular data from at least one of an inertial measuring unit, a laser distance meter, a radio frequency triangulation, and a radio distance meter.

For example, according to another embodiment, the computing unit is configured to determine a first steering angle based on positioning information from the positioner, particularly operating in high-precision mode, e.g. based on RTK positioning, and stored structural reference data for the haulage vehicle, wherein the computing unit is configured to determine a first target steering angle, particularly based on a derived yaw rate of the haulage vehicle, and the steering instructions comprise an indication whether the first target steering angle is reached or not.

According to another embodiment, the system comprises a steering sensor configured to determine a second steering angle of the haulage vehicle, the computing unit is configured to determine at any point in time as long as the transmission of the haulage vehicle is in reverse an instantaneous second target steering angle, based on stored structural reference data for the haulage vehicle, an instantaneous positioning information, and the target position, wherein the steering instructions comprise an indication whether the second target steering angle is reached or not.

Thus, in this embodiment at any point in time, i.e. even when the haul truck is moving very slowly or when the haul truck is not moving at all, the driver is provided with instructions on how to set the correct steering angle. In particular, no position tracking nor a manual evaluation for setting the correct steering angle is required by the driver. This makes reversing the haul truck straight forward, wherein virtually no special expertise or training is required for the driver.

According to a further embodiment, the computing unit and the light indicator are configured to indicate whether the first and/or second target steering angle is reached or not based on a defined visual coding, particularly a defined blink coding and/or a defined color coding, and/or the driver assistance system comprises a speaker which is configured to indicate whether the first and/or second target steering angle is reached or not based on a defined audible signal, e.g. a beep coding or a voice prompt.

BRIEF SUMMARY OF THE DRAWINGS

The system according to the invention is described or explained in more detail below, purely by way of example, with reference to working examples shown schematically in the drawing. Specifically.

DETAILED DESCRIPTION

Figure 1:
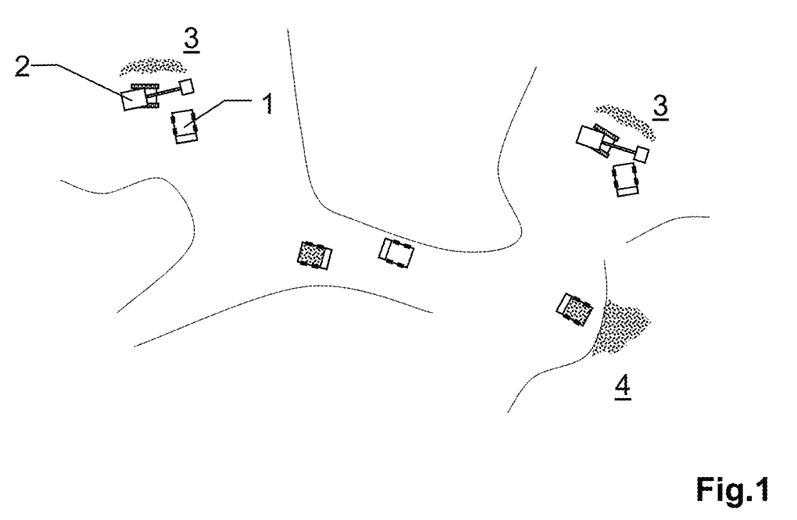
FIG. 1: schematically depicts a mine site with loading and dumping areas.

FIG. 1 schematically depicts a surface mine with heavy duty equipment, particularly haulage vehicles such as haul trucks 1 being loaded with excavation material by oversized earthmoving machines such as large shovels 2. Such a mine site is typically operated non-stop, i.e. day and night and in a variety of adverse conditions, wherein it is subject to high time pressure. Therefore, loading 3 and dumping 4 operations have to be performed in a most efficient way, i.e. avoiding any repositioning of the haul trucks 1 and thus reducing any idle time of the shovels 2.

Furthermore, since some of the machines or haulage vehicles may be exceedingly large and heavy, collisions may lead to severe damage or injuries of the operators/drivers. It is known to use GNSS-devices such as GPS on board of haulage vehicles and other machines to generate proximity warnings in order to reduce the risk of collisions.

However, the positional accuracy of such generic collision avoidance systems is typically insufficient to enable precise machine or vehicle positioning, e.g. for efficiently positioning a haul truck 1 under a shovel 2. Thus, for example, precisely backing a truck into a proper loading or dumping location still requires particular know-how and special training of the driver.

According to the invention, a driver assistance system with enhanced position accuracy, particularly in the vicinity of a loading 3 and dumping 4 area, and simplified operability is provided. Therefore, efficient backing manoevering of large oversized haulage vehicles are possible without requiring special expertise of the driver of the haulage vehicle 1.

Figure 2A:
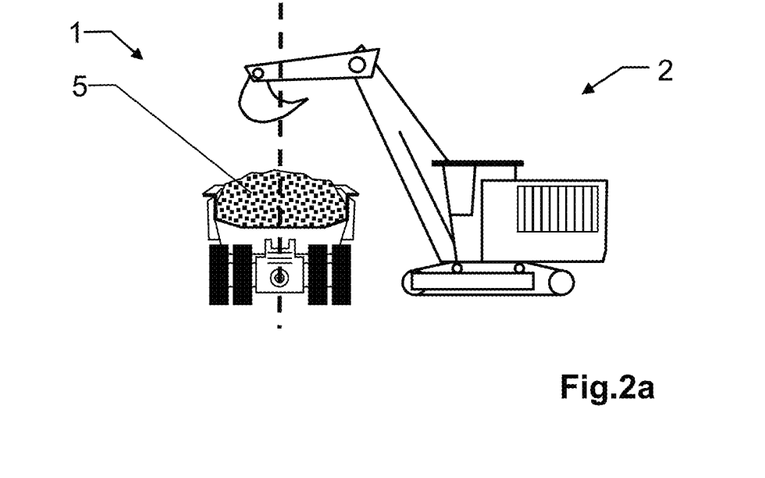
FIG. 2a,b: schematically depicts a loading of a haul truck in a well aligned condition (a) and in case the haul truck is misaligned with respect to the bucket (b)
Figure 2B:
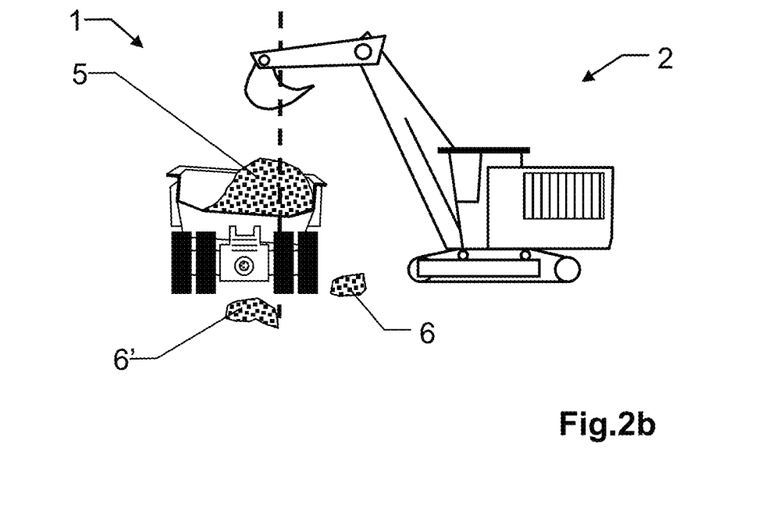

Another aspect of positioning systems on mine sites may be to reduce maintenance outlay, which is illustrated by FIGS. 2a and 2b.

FIG. 2a shows the haul truck 1 in a well aligned positioning under the shovel 2, which provides a well centered load 5 on the haul truck 1, e.g. resulting in longer tire life and lowered suspension maintenance.

In contrast, an off centered distribution of weight as illustrated by FIG. 2b has a directly attributable effect on tire wear and suspension components, which may increase operational cost and may lower availability of the trucks. Furthermore, rock spill 6 may occur during loading or at start of motion of the haul truck 1 after loading. In particular if rock spill 6' falls from the center of the bed, i.e. between the tires of the haul truck 1, it may lead to tire damage when the next truck backs over the spillage.

A mispositioning of the haul truck 1 may further tempt an operator of the shovel 2 to reach beyond the proper motion radius of the shovel rather than asking the truck driver to reposition. This may lead to unnecessary stress on shovel elements or even accidental collisions between the shovel 2 and the truck 1 may occur. In particular, a collision may result in mechanical shock that can be very harsh on the material but also on the truck driver.

Figure 3A:
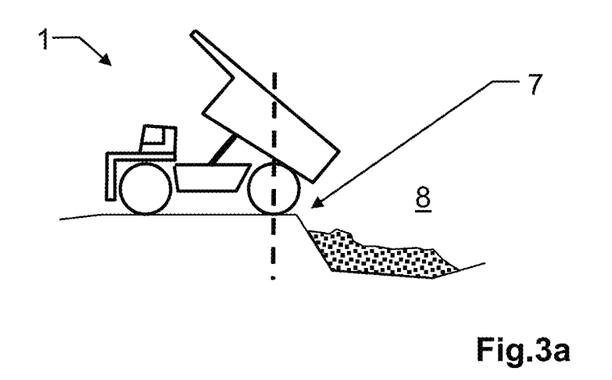
FIG. 3a,b: schematically depicts dumping by a haul truck, wherein the haul truck has been positioned correctly at the edge of the dump (a) and wherein the truck has been stopped too early (b)
Figure 3B:
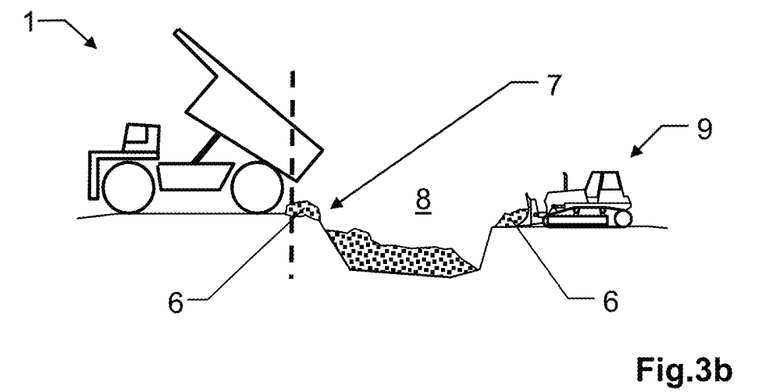

Precise positioning of a haul truck 1 may further be important for dumping as illustrated in FIGS. 3a and 3b. For example, the haul truck needs to be reversed towards an edge 7 of a dump 8 at a precise approaching angle, wherein the haul truck 1 needs to be moved/stopped exactly at the proper distance to the edge 7, e.g. in order to prevent breaking through the berm or in order to avoid spillage.

On the one hand, FIG. 3a illustrates a haul truck 1 which has been correctly positioned at the edge of the dump, e.g. providing an efficient dumping without requiring any support equipment.

On the other hand, FIG. 3b illustrates a haul truck 1 that has been stopped too early before the edge 7, e.g. causing some spillage near the edge. Thus, an allocated bulldozer 9 may be required to push the spillage 6 into the dump 8. Alternatively, an allocated bulldozer 8 and a haul truck 1 equipped with the inventive driver assistance system may work together in a complementary manner, e.g. wherein the edge 7 and the proper haul truck positioning are continuously and precisely defined by the bulldozer operator in order to provide optimal fill guidance for dumping.

Figure 4:
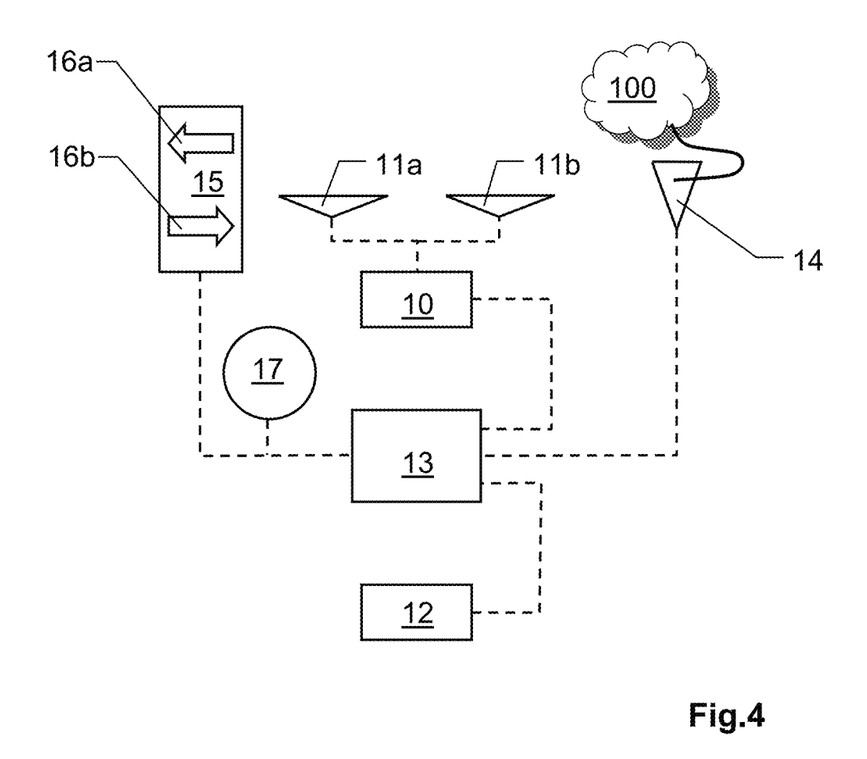
FIG. 4: shows a block diagram of an exemplary embodiment of the inventive driving assistance system.

FIG. 4 shows a block diagram of an exemplary embodiment of the inventive driving assistance system.

According to the invention, the driving assistance system may for example comprise a hybrid mode dual GNSS receiver 10 with two GNSS antennas 11a,11b adapted and specifically foreseen to be mounted on the haulage vehicle 1 (see FIG. 1). The GNSS receiver 10 is configured to generate a positioning information for the haulage vehicle 1 and to be operable in a low-precision GNSS mode and in a high-precision GNSS mode, wherein the high-precision GNSS mode provides higher positioning accuracy than the low-precision GNSS mode, particularly wherein the high-precision GNSS mode is based on RTK positioning ("real time kinematic positioning") based on the two GNSS antennas 11a,11b.

The system may further comprise a steering sensor 12, e.g. a steering encoder, configured to determine a steering angle of the haulage vehicle 1, and a computing unit 13, e.g. a rugged computer or tablet, configured to derive a defined target position and corresponding steering instructions to reverse the haulage vehicle 1 into the target position, i.e. a target position and orientation of the haulage vehicle 1 in that target position.

The system further comprises a transceiver 14 of a machine-to-machine communication network, the transceiver 14 being adapted and specifically foreseen to be mounted on the haulage vehicle 1. Therefore, the haul truck 1 can communicate with a shovel 2 (see. FIG. 1), e.g. for interactively exchanging position and for indicating a particular obstacle in the vicinity of the shovel 2. In particular, the planned route may therefore consider mapped fixed obstacles such as infrastructure, as well as potential collisions with variable objects, e.g. collisions with a variably positioned shovel body or its counterweight.

An actual dipper position 100 is logged by a log interface (not shown) mounted on the earthmoving machine 2, and provided to the computing unit 13 via the machine-to-machine communication network 14. For example, an operator of the shovel may hold the dipper in a desired position and log this position, e.g. by pressing a button of the log interface to initiate a position determination of the dipper, wherein the determined dipper position is logged as the optimal load spot. A status indicator may then indicate to a haul truck driver that a load spot is stored and available to load the truck.

Thus, according to this embodiment the target position and the corresponding steering instructions are based on the determined steering angle, the positioning information, and the logged dipper position. Furthermore, a continuously updated map with fixed and variable object positions may be used in addition.

The system further comprises a light indicator 15 specifically foreseen to be mounted on the haulage vehicle 1, e.g. LED indicators to be mounted on a rear view mirror of the haulage vehicle 1. The light indicator 15 is configured to provide at least two states, namely one state which is indicative of an instruction for left steering 16a and another state which is indicative of an instruction for right steering 16b, respectively.

In this embodiment, the driver assistance system further comprises a speaker 17 which is configured to indicate the distance to the target position based on a defined audible signal, e.g. a beep coding or a voice prompt.

Figure 5:
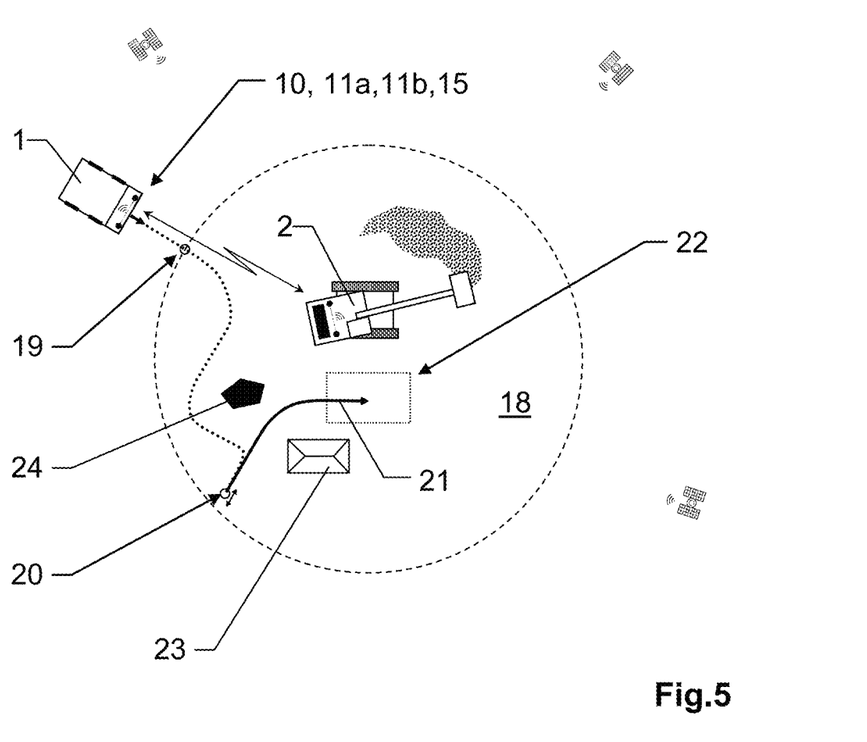
FIG. 5: schematically depicts an approaching and loading workflow based on the inventive driving assistance system.

FIG. 5 schematically illustrates an exemplary approaching and loading workflow based on the inventive driving assistance system according to the embodiment described by FIG. 4.

A haul truck 1 equipped with the inventive driver assistance system enters a shovel pit, wherein an area 18 for high-precision positioning is defined around a shovel 2. For example, the high-precision area 18 may be based on mapped position information, e.g. defining a fixed area stored on the computing unit 13 (see FIG. 4), or the high-precision area 18 may be defined with respect to the actual shovel position, e.g. wherein the shovel 2 transmits its current position and corresponding area information over the machine-to-machine network, e.g. the high-precision area 18 being a radial defined area co-moving with the shovel 2 as shown by the figure.

When the haul truck 1 enters 19 the high-precision area 18 it is ensured that the GNSS receiver 10 is operating in high precision mode, e.g. allowing for decimeter accuracy or better.

When the transmission of the haul truck is shifted to reverse 20, a reverse path 21 will be planned to a spot location 22, e.g. avoiding fixed objects such as buildings 23 as well as variable objects such as big rocks 24 or the moving shovel body.

In order to use this path 21 an optimal steering angle will be calculated and the haul truck driver will be prompted to adjust the steering angle to this value through light bars 15 (see FIG. 4) attached to the mirrors of the haul truck 1 and through an audible prompt. For example, the steering angle may be calculated using information given by the high-precision positioning, specifically including a yaw rate and machine/truck dimensions. As the driver reverses the truck 1, the trucks position and orientation will be compared to the calculated path 21 and prompts are given to the operator if corrections are necessary. For example, a distance to the stopping point for reaching the final target position 22 will be indicated by how quickly the directional indicators 15 on the mirrors blink and possibly through a beep coding having an increased beep frequency the closer the truck 1 is located to its determined end position 22. By way of example, when the spot 22 is reached, the indicators 15 may be on solid and an audible prompt may be given.

Alternatively, according to another embodiment of the inventive driver assistance system, a steering angle of the haulage vehicle is determined by a steering sensor, wherein the computing unit is configured to directly determine an instantaneous target steering angle, i.e. without requiring a comparison between the actual position and orientation to the calculated path 21, e.g. wherein the dimensions and information on different curve radii of the haul truck as a function of different steering angles are calculated on the computing unit. Therefore, the driver of the haul truck may be informed at any point in time, e.g. by the light indicator or an audible prompt, that he has set the correct steering angle to follow the calculated path 21. This makes reversing the haul truck straight forward, wherein virtually no special expertise or training is required for the driver.

It goes without saying that the inventive driving assistance system may also make use of a range of generic alarming and collision avoidance systems (CAS systems), e.g. it may further make use of information from optical distance meters and/or radar based CAS systems.

FIGS. 6a to 6d indicate an inventive display in a cab of a haul truck 1 (see FIG. 1) at different stages of approaching a shovel 2. In this embodiment, the display at least indicates the actual position of the haul truck 1', positions of shovels 2', positions of dumping areas 4', fixed objects to be avoided 23', e.g. buildings, and variable objects 24'.

In this embodiment the auto-zoom functionality is for example configured to automatically switch the zoom factor based on a radial distance of the haul truck 1' to the shovel 2', wherein the zoom-factor is set in such a way that the positions of the haul truck 1' and the shovel 2' are displayed at any point in time, i.e. the truck and target spot are always put on an optimal position on the display. Therefore, the entire operation is automatic and no intervention of the truck driver is required, e.g. reducing any risk due to distraction of the truck driver.

Figure 6A:
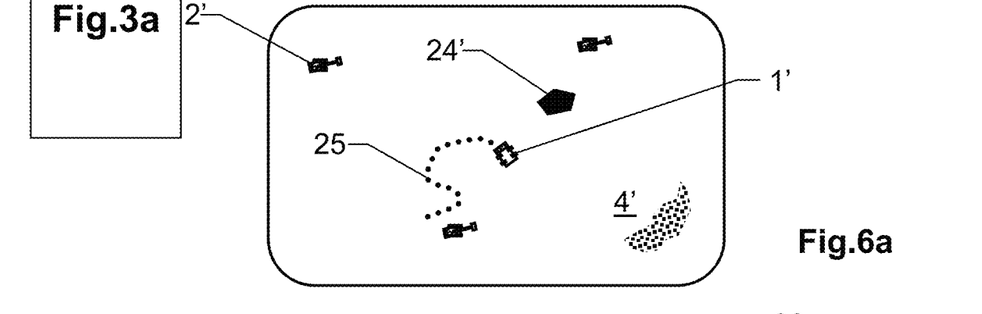
FIG. 6a-d: schematically depicts a display in a cab of a haul truck, the display having an auto-zoom functionality configured to adjust a zoom-factor of the display content for supporting the inventive loading workflow.

In a first zoom setting, as illustrated by FIG. 6a, the display indicates a zoomed-out view of the mine site environment around the haul truck 2'. For example, a haul truck driver may see the positions of various shovels 2'. In particular, a suggested approach path 25 to the nearest shovel may further be automatically indicated. Alternatively, multiple possible approach paths (not shown) may be suggested, or the approach path may for example be suggested based on a shovel type or a shovel ID associated to the haul truck 1' and/or the shovels 2'.

Figure 6B:
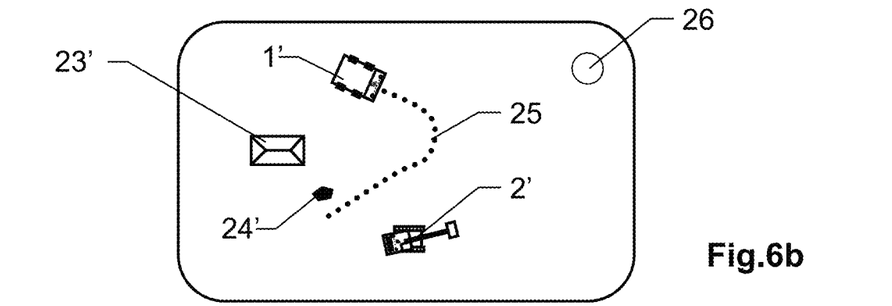
Figure 6C:
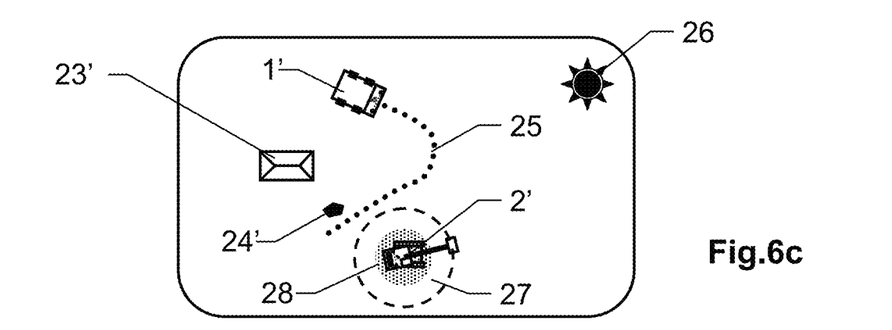

FIG. 6b illustrates the display wherein the haul truck 1' has moved closer to the shovel 2' by following the suggested approach path 25. Furthermore, the display now provides an indication 26 whether a valid target position 22 has already been determined, i.e. whether the shovel operator has already logged a valid loading tool position. As soon as a valid target position 22 has been determined, as shown by FIG. 6c, an indication 26 may flash and/or an acoustic signal may be given. Furthermore, additional information may be provided, e.g. such as a cantilever/dipper operating area 27 and a forbidden area 28, which must be avoided by the haul truck driver.

Figure 6D:
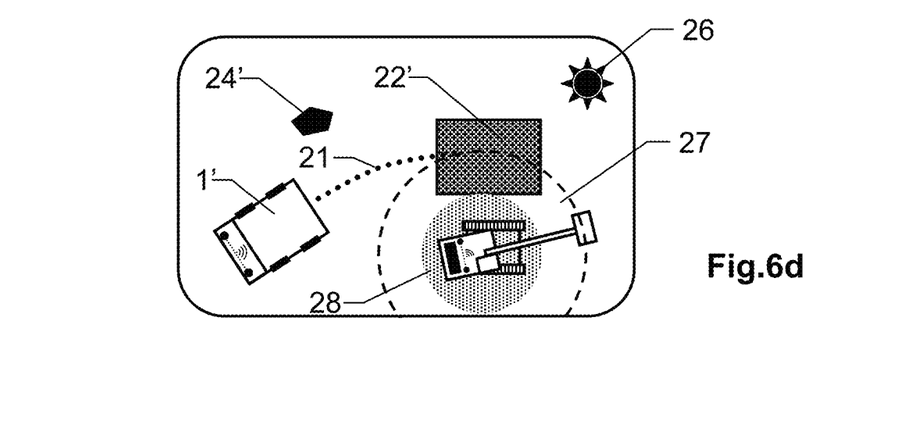

FIG. 6d eventually illustrates an exemplary scenario of a maximally zoomed-in situation, wherein the haul truck 1' has already started backing into the target position 22, which is now clearly indicated 22' on the display.

Although the invention is illustrated above, partly with reference to some preferred embodiments, it must be understood that numerous modifications and combinations of different features of the embodiments can be made. All of these modifications lie within the scope of the appended claims.

What is claimed is:

1. A driving assistance system for reversing a mining haulage vehicle, the driving assistance system comprising:
    a positioner configured to be mounted on the haulage vehicle and to generate positioning information for the haulage vehicle;
    a computing unit configured to derive a defined target position and corresponding steering instructions to reverse the haulage vehicle into a target position based on the positioning information;
    a machine-to-machine communication network configured to provide machine-to-machine communication between a first transceiver configured to be mounted on the haulage vehicle and a second transceiver which is configured to be mounted on an earthmoving machine having a loading tool;
    a light indicator configured to be mounted on the haulage vehicle and is configured to provide at least two states, namely one state which is indicative of an instruction for left steering and another state which is indicative of an instruction for right steering, respectively; and
    a log interface configured to be mounted on the earthmoving machine, wherein the log interface is configured to log an actual position of the loading tool of the earthmoving machine as a load spot or dump spot, which defines the target position, wherein the log interface is configured such that a position determination of the actual position of the loading tool is initiated by manual input,
    wherein the computing unit is further configured to derive the target position and to provide the steering instructions to the light indicator as a function of the logged load spot or dump spot, and
    wherein the driving assistance system is configured such that the steering instructions are provided to the light indicator when the transmission of the haulage vehicle is shifted to reverse.

2. The driving assistance system according to claim 1, wherein:
    the positioner is further configured to be operable in a low-precision mode and in a high-precision mode, wherein the high-precision mode provides higher positioning accuracy than the low-precision mode, and
    the computing unit is further configured to:
        determine whether the haulage vehicle is located inside or outside a defined area, and
        check whether the positioner is operating in the high-precision mode,
    the driving assistance system is configured to check whether the positioner is operating in high-precision mode when the haulage vehicle enters the defined area and wherein the computing unit is configured to turn on the high-precision mode or to provide a warning in case the high-precision mode is not available.

3. The driving assistance system according to claim 2, wherein the computing unit is further configured to determine a first steering angle based on:
- positioning information from the positioner, and
- stored structural reference data for the haulage vehicle, wherein the computing unit is further configured to determine a first target steering angle, and the steering instructions comprise an indication whether the first target steering angle is reached or not.

4. The driving assistance system according to claim 3, wherein the computing unit and the light indicator are each configured to indicate whether the first and second target steering angle is reached or not based on a defined visual coding, and wherein the driver assistance system comprises a speaker which is configured to indicate whether the first and second target steering angle is reached or not based on a defined audible signal.

5. The driving assistance system according to claim 3, wherein the computing unit and the light indicator are each configured to indicate whether the first and second target steering angle is reached or not based on a defined visual coding, or wherein the driver assistance system comprises a speaker which is configured to indicate whether the first and second target steering angle is reached or not based on a defined audible signal.

6. The driving assistance system according to claim 1, wherein the positioner comprises at least one of:
- a GNSS receiver having two GNSS antennas, and
- a point-to-point radio ranging system, providing time-of-flight measurements by radio frequency signals between anchors and tags, based on a defined measuring protocol, wherein a set of anchors is adapted and specifically foreseen to be mounted on the haulage vehicle.

7. The driving assistance system according to claim 1, wherein the target position or the steering instructions are derived based on information distributed over the machine-to-machine network, and wherein the information comprises at least one of:
- a machine type of the earthmoving machine,
- a machine ID of the earthmoving machine,
- a positioning information for the earthmoving machine,
- a rotational center or a loading range of the earthmoving machine,
- input from an operator of the earthmoving machine,
- a vehicle type of the haulage vehicle,
- a vehicle ID of the haulage vehicle,
- a positioning information for the haulage vehicle, and
- input from a driver of the haulage vehicle.

8. The driving assistance system according to claim 1, wherein the transceivers of the machine-to-machine communication network are configured to send a broadcast signal according to a defined broadcast protocol.

9. The driving assistance system according to claim 1, wherein the steering instructions are provided in such a way that the haulage vehicle does not approach the earthmoving machine closer than a defined radius.

10. The driving assistance system according to claim 1, wherein:
- the computing unit is further configured to derive a distance of the haulage vehicle to the target position corresponding to the target position,
- the computing unit and the light indicator are configured to indicate the distance based on a defined visual coding, and
- the driver assistance system comprises a speaker which is configured to indicate the distance based on a defined audible signal.

11. The driving assistance system according to claim 1, wherein the system comprises a display specifically foreseen to be mounted in an operator cab of an earthmoving machine or a display specifically foreseen to be mounted in the cab of the haulage vehicle, wherein the display is configured to indicate at least one of:
- a position of the haulage vehicle,
- a planned reversing path of the haulage vehicle,
- an approaching path to the earthmoving machine,
- a position of the earthmoving machine,
- a target position of the earthmoving machine when the haulage vehicle is approaching,
- positioning information of surrounding vehicles,
- positioning information of surrounding earthmoving machines,
- the target position of the haulage vehicle,
- areas to be avoided by the haulage vehicle, and
- objects of interest along the reversing path of the haulage vehicle.

12. The driving assistance system according to claim 11, wherein the display mounted in the cab of the haulage vehicle is further configured to have an auto-zoom functionality configured to adjust a zoom-factor of the display content such that the position of the haulage vehicle and the earthmoving machine are displayed at any point in time.

13. The driving assistance system according to claim 1, wherein the target position or the steering instructions are derived based on additional positioning data provided to the computing unit comprising at least one out of the group consisting of: an inertial measuring unit, a laser distance meter, a radio frequency triangulation, and a radio distance meter.

14. The driving assistance system according to claim 1, further comprising:
- a steering sensor configured to determine a second steering angle of the haulage vehicle,
- wherein the computing unit is configured to determine an instantaneous second target steering angle while the transmission of the haulage vehicle is in reverse based on stored structural reference data for the haulage vehicle, an instantaneous positioning information, and the target position, and
- wherein the steering instructions comprise an indication whether the second target steering angle is reached or not.

15. The driving assistance system according to claim 14, wherein the computing unit and the light indicator are each configured to indicate whether the first and second target steering angle is reached or not based on a defined visual coding, and wherein the driver assistance system comprises a speaker which is configured to indicate whether the first and second target steering angle is reached or not based on a defined audible signal.

16. The driving assistance system according to claim 14, wherein the computing unit and the light indicator are each configured to indicate whether the first and second target steering angle is reached or not based on a defined visual coding, or wherein the driver assistance system comprises a speaker which is configured to indicate whether the first and second target steering angle is reached or not based on a defined audible signal.

17. The driving assistance system according to claim 1, wherein the log interface is configured for receiving the manual input.

18. The driving assistance system according to claim 1, wherein the log interface includes at least one input device for receiving the manual input.

19. The driving assistance system according to claim 1, wherein the log interface includes at least one button for receiving the manual input.

20. The driving assistance system according to claim 1, wherein the log interface is configured for receiving the manual input form an operator when the loading tool is at the load spot or dump spot.

* * * * *

UNITED STATES PATENT AND TRADEMARK OFFICE
CERTIFICATE OF CORRECTION

PATENT NO.       : 10,894,561 B2
APPLICATION NO.  : 16/005556
DATED            : January 19, 2021
INVENTOR(S)      : Kaufmann et al.

Page 1 of 1

It is certified that error appears in the above-identified patent and that said Letters Patent is hereby corrected as shown below:

On the Title Page

Item (73), delete "TECHNOLOGIA" and insert -- TECNOLOGIA --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*